US009912082B2

(12) United States Patent
Ichikawa et al.

(10) Patent No.: US 9,912,082 B2
(45) Date of Patent: Mar. 6, 2018

(54) ELECTRIC WIRE CONNECTION STRUCTURE

(71) Applicant: YAZAKI CORPORATION, Tokyo (JP)

(72) Inventors: Yoshiaki Ichikawa, Shizuoka (JP); Hirotaka Mukasa, Shizuoka (JP); Hirokuni Koike, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/161,985

(22) Filed: May 23, 2016

(65) Prior Publication Data

US 2016/0268702 A1    Sep. 15, 2016

Related U.S. Application Data

(63) Continuation of application No. PCT/JP2014/084380, filed on Dec. 25, 2014.

(30) Foreign Application Priority Data

Dec. 25, 2013 (JP) ................................. 2013-267771

(51) Int. Cl.
| | |
|---|---|
| *B05B 5/00* | (2006.01) |
| *H01R 4/24* | (2018.01) |
| *H01M 2/20* | (2006.01) |
| *H01R 4/02* | (2006.01) |
| *H01R 4/30* | (2006.01) |
| *H01R 31/08* | (2006.01) |

(52) U.S. Cl.
CPC ............ *H01R 4/242* (2013.01); *H01M 2/202* (2013.01); *H01R 4/029* (2013.01); *H01R 4/30* (2013.01); *H01R 31/08* (2013.01)

(58) Field of Classification Search
CPC ........... H01M 14/00; H01M 2/24; H01M 2/26
(Continued)

(56) References Cited

U.S. PATENT DOCUMENTS

| | | | | |
|---|---|---|---|---|
| 6,261,719 B1 * | 7/2001 | Ikeda | ................... | H01M 2/202 |
| | | | | 429/120 |
| 6,290,552 B1 * | 9/2001 | Saito | ................... | H01M 2/206 |
| | | | | 439/736 |

(Continued)

FOREIGN PATENT DOCUMENTS

| | | |
|---|---|---|
| JP | 2010-114025 A | 5/2010 |
| JP | 2011-49047 A | 3/2011 |

(Continued)

OTHER PUBLICATIONS

International Search Report of PCT/JP2014/084380, dated Feb. 17, 2015. [PCT/ISA/210].

(Continued)

*Primary Examiner* — Hien Vu
(74) *Attorney, Agent, or Firm* — Sughrue Mion, PLLC

(57) ABSTRACT

A electric wire connection structure includes a flat cable including a plurality of linear conductors and an insulator covering the linear conductors; a plurality of busbars for electrically connecting electrode terminals provided on two or more of battery cells stretched in a given direction among the plurality of battery cells stacked in the direction and included in a battery module, the electrode terminals being lined up in the direction; and connecting members provided for each combination of the linear conductors and the busbars to include a connecting member main body and a pressure welding blade portion connected to the connecting member main body, a pressure welding groove being formed on the pressure welding blade portion.

7 Claims, 8 Drawing Sheets

(58) Field of Classification Search
 USPC ............. 429/7, 121, 158, 160; 439/500, 627
 See application file for complete search history.

(56) References Cited

U.S. PATENT DOCUMENTS

| | | | | |
|---|---|---|---|---|
| 8,449,333 B2* | 5/2013 | Ikeda | .................. | H01M 2/1061 |
| | | | | 439/627 |
| 2004/0043663 A1* | 3/2004 | Ikeda | .................... | H01M 2/206 |
| | | | | 439/627 |
| 2012/0328920 A1 | 12/2012 | Takase et al. | | |
| 2013/0234511 A1 | 9/2013 | Murata | | |

FOREIGN PATENT DOCUMENTS

| | | | |
|---|---|---|---|
| JP | 2011-210711 A | 10/2011 | |
| JP | 2012-198995 A | 10/2012 | |
| JP | WO2013/030891 A | 3/2013 | |

OTHER PUBLICATIONS

Written Opinion of PCT/JP2014/084380, dated Feb. 17, 2015. [PCT/ISA/237].
Communication dated May 2, 2017, issued from the Japan Patent Office in corresponding Application No. 2015-555013.

* cited by examiner

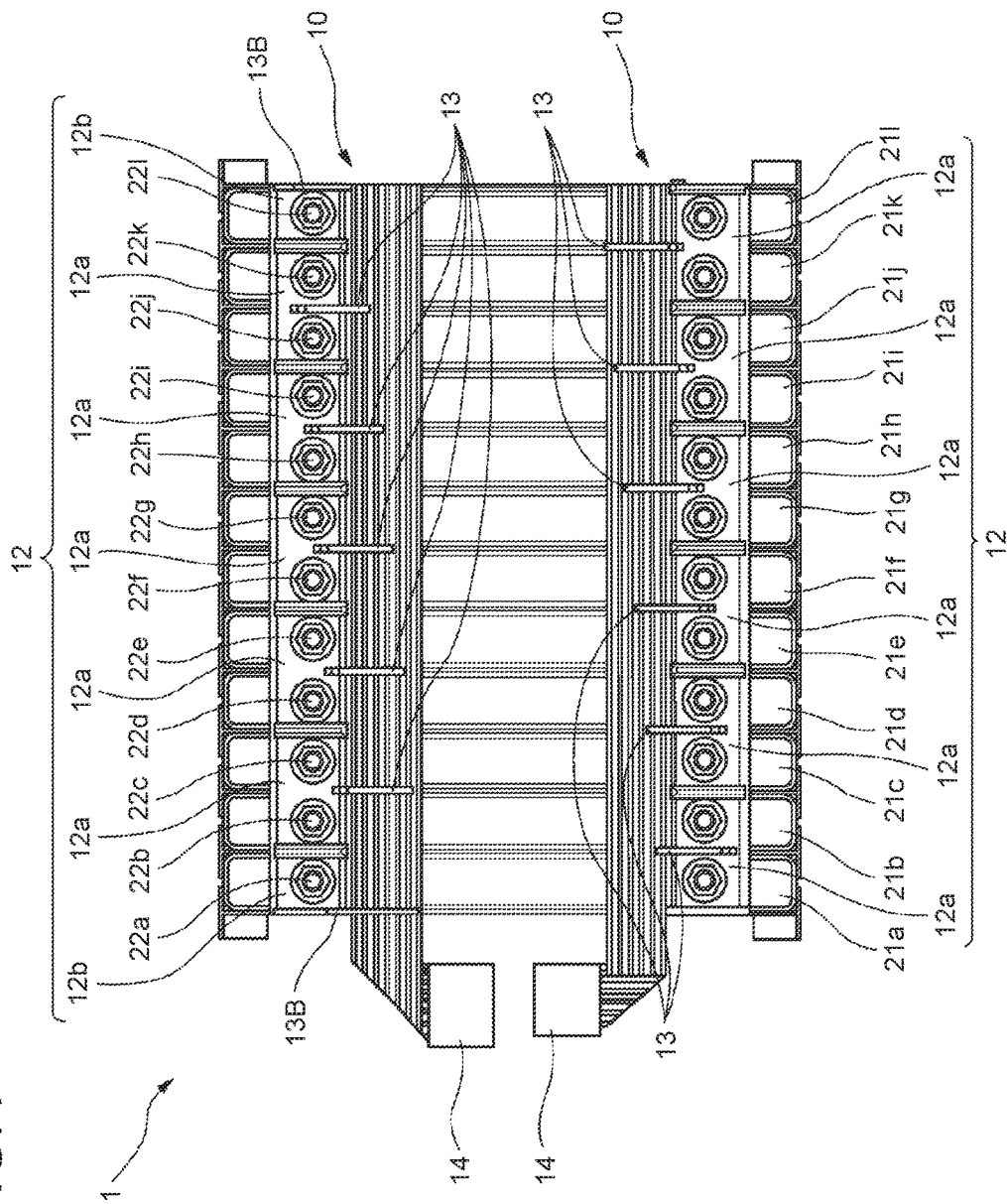

ELECTRIC WIRE CONNECTION STRUCTURE

CROSS-REFERENCE TO RELATED APPLICATION

This application is a continuation application of International Application PCT/JP2014/084380, filed on Dec. 25, 2014, and designating the U.S., the entire contents of which are incorporated herein by reference.

BACKGROUND OF THE INVENTION

1. Field of the Invention

The present invention relates to an electric wire connection structure.

2. Description of the Related Art

A high-voltage detection module device disclosed in Japanese Laid-open Patent Publication No. 2010-114025 and a battery module disclosed in Japanese Laid-open Patent Publication No. 2011-210711 are known as battery wiring modules.

Japanese Laid-open Patent Publication No. 2010-114025 discloses the high-voltage detection module device in which a plurality of busbars and a flat cable are arranged in an insulated frame body combined with a main battery pack body, a notch is cut in a predetermined shape between respective conductor lines of the flat cable, and the conductor lines separated except for bases are welded to predetermined busbars.

In addition, Japanese Laid-open Patent Publication No. 2011-210711 discloses the battery module which includes a plurality of busbars that electrically connect neighboring electrode terminals of a single battery, and a flexible flat cable (FFC) for measuring a voltage of the single battery, wherein an exposed conductor of the FFC is connected to each busbar using welding.

In each of Japanese Laid-open Patent Publication No. 2010-114025 and Japanese Laid-open Patent Publication No. 2011-210711, when each conductor of a flat cable is connected to busbars, the flat cable needs to be processed before connection. In Japanese Laid-open Patent Publication No. 2010-114025, there is need to cut a notch in a predetermined shape between respective conductor lines of the flat cable, separate the respective conductor lines except for bases, and bend the respective conductor lines at base portions. In Japanese Laid-open Patent Publication No. 2011-210711, there is need to separate an insulating resin of an FFC using a laser to expose a conductor corresponding to each busbar.

SUMMARY OF THE INVENTION

It is an object of the present invention to provide an electric wire connection structure capable of connecting each conductor of a flat cable to busbars with no need to process the flat cable in advance.

In order to achieve the above mentioned object, an electric wire connection structure according to one aspect of the present invention includes a flat cable including a plurality of linear conductors and an insulator covering the linear conductors separated from each other and disposed on the same plane; a plurality of busbars for electrically connecting electrode terminals provided on at least two or more battery cells stretched in a given direction among a plurality of battery cells stacked in the direction and included in a battery module, the electrode terminals being lined up in the direction; and a connecting member provided for each combination of the linear conductors and the busbars to include a connecting member main body and a pressure welding blade portion connected to the connecting member main body, a pressure welding groove being formed on the pressure welding blade portion. Herein, the connecting member allows an inner edge of the pressure welding groove to touch the linear conductors exposed from the insulator due to press-fitting into the pressure welding groove, and allows the connecting member main body to be electrically connected to the busbars.

According to another aspect of the present invention, the connecting member electrically connects a portion of the connecting member main body to the busbars by welding the portion to the busbars.

According to still another aspect of the present invention, the connecting member is provided to extend from the busbars.

According to still another aspect of the present invention, the busbars and the connecting member are formed by punching a metallic plate, and the connecting member main body of the connecting member is bent such that a direction in which the pressure welding blade portion is press-fitted is perpendicular to the busbars having flat plate-shaped.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a plan view illustrating the battery pack in which the battery wiring module illustrated in FIGS. 1 and 2 is assembled with the battery module;

DETAILED DESCRIPTION OF THE PREFERRED EMBODIMENTS

Hereinafter, a detailed description will be given of an embodiment of an electric wire connection structure according to the invention with reference to drawings. The invention is not limited by the embodiment.

Figure 1:
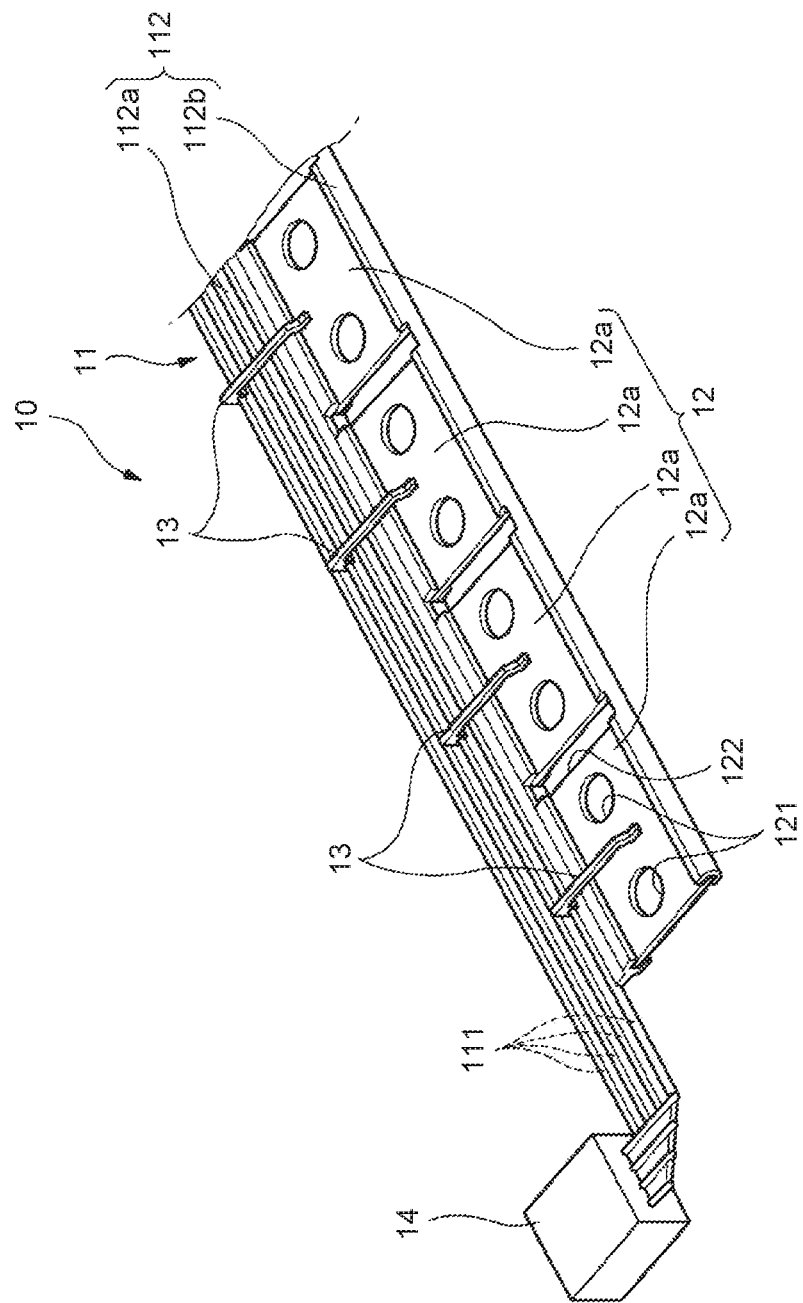
FIG. 1 is a perspective view illustrating an embodiment of a battery wiring module to which an electric wire connection structure of the invention is applied.
Figure 2:
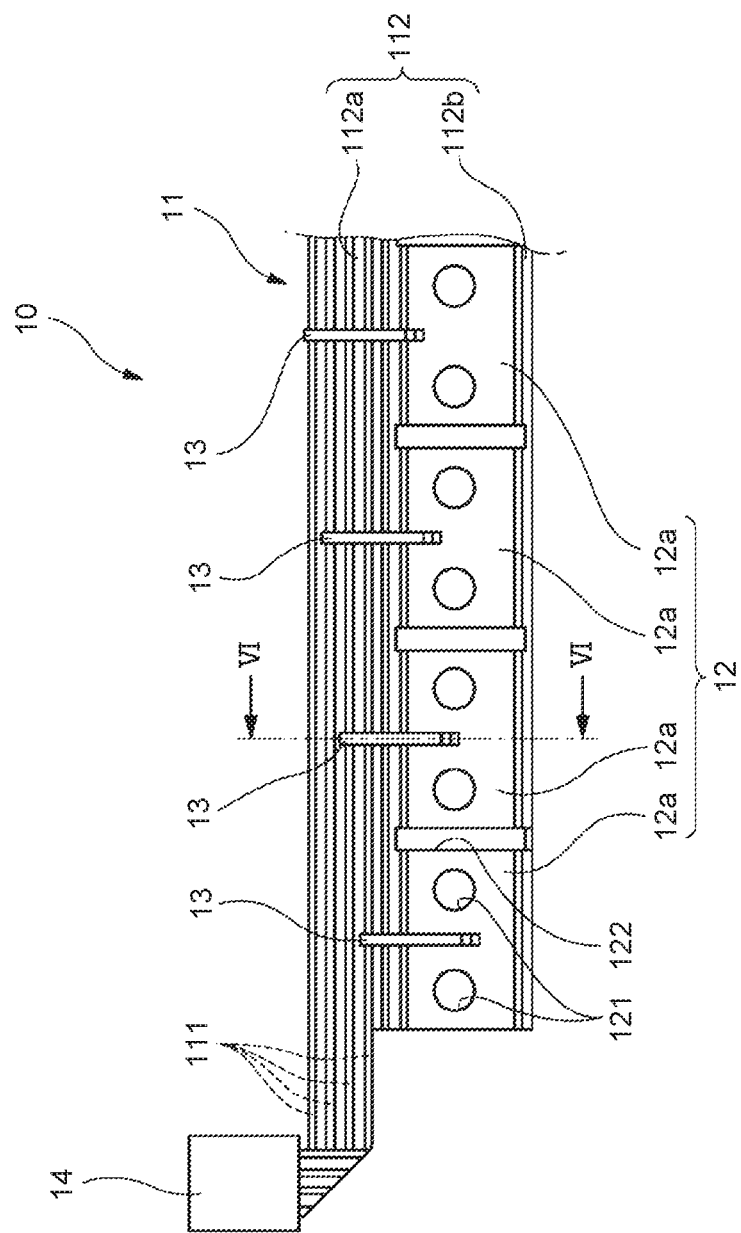
FIG. 2 is a plan view illustrating the embodiment of the battery wiring module to which the electric wire connection structure of the invention is applied.
Figure 3:
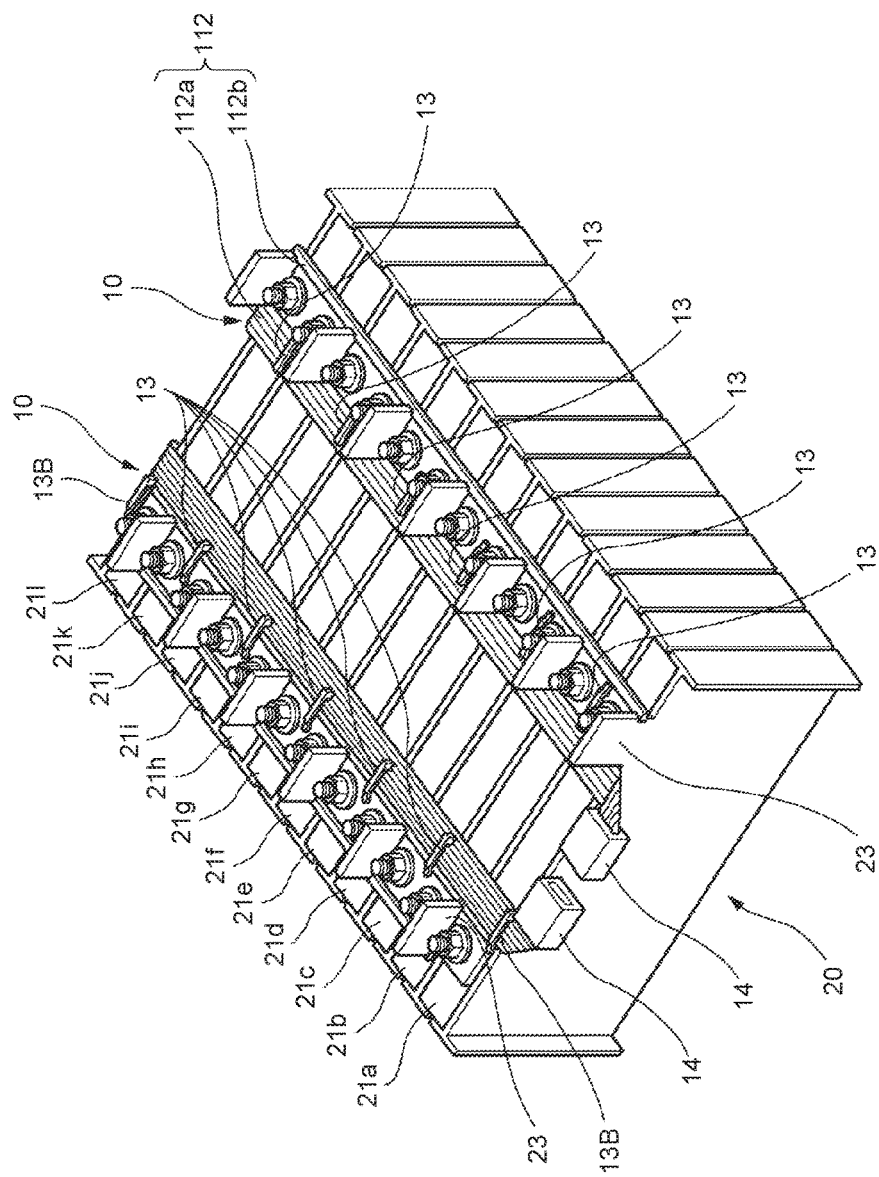
FIG. 3 is a perspective view illustrating a battery pack in which the battery wiring module illustrated in FIGS. 1 and 2 is assembled with a battery module.
Figure 5A:
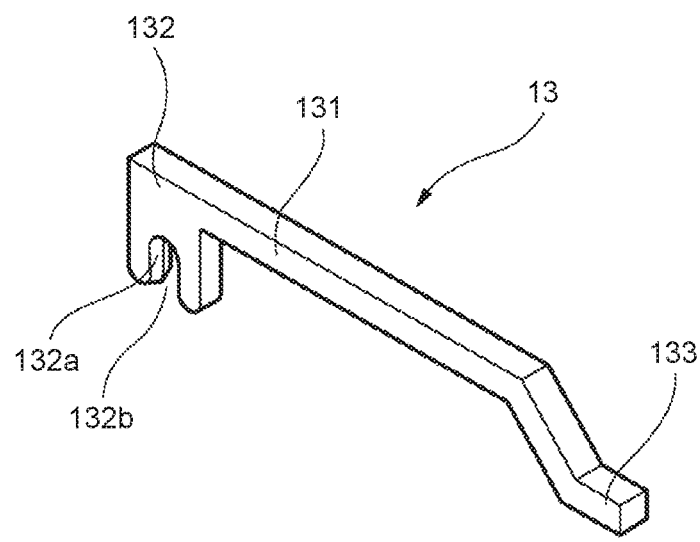
FIG. 5A is a perspective view for description of an aspect of a connecting member used for the electric wire connection structure of the invention.
Figure 5B:
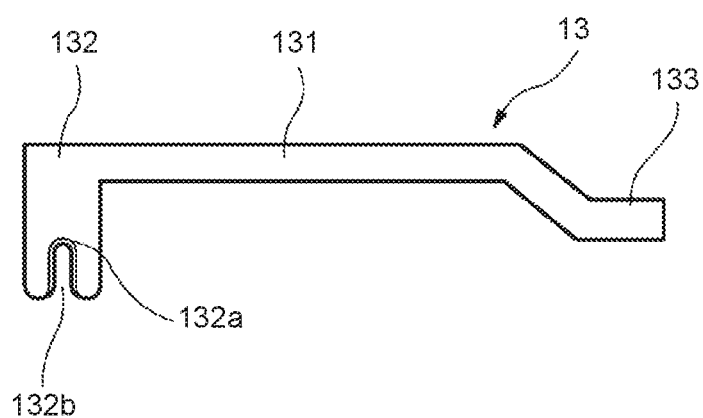
FIG. 5B is a side view for description of the aspect of the connecting member used for the electric wire connection structure of the invention.
Figure 6:
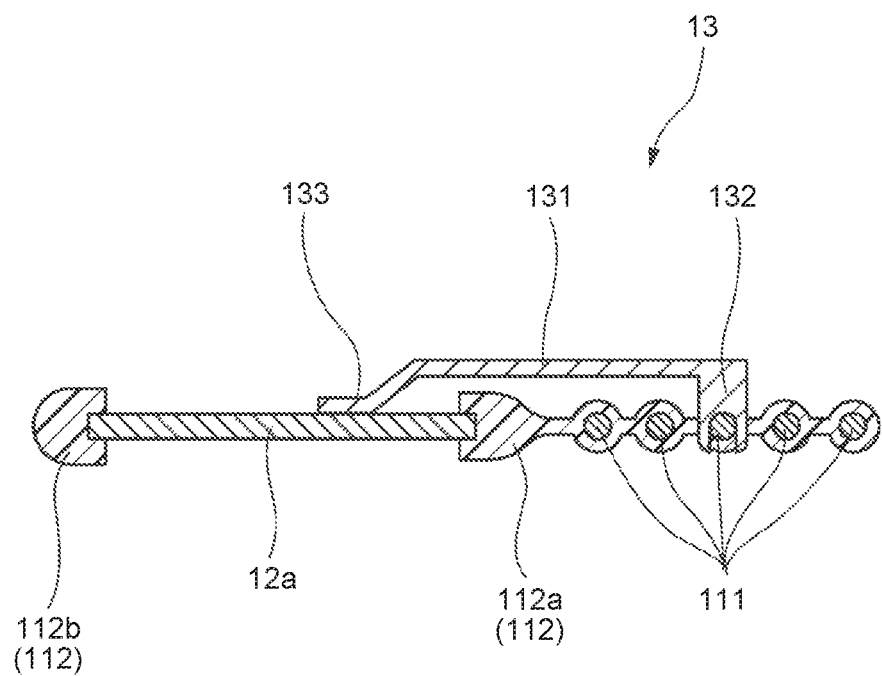
FIG. 6 is a cross-sectional view taken along the line VI-VI of FIG. 2.
Figure 7A:
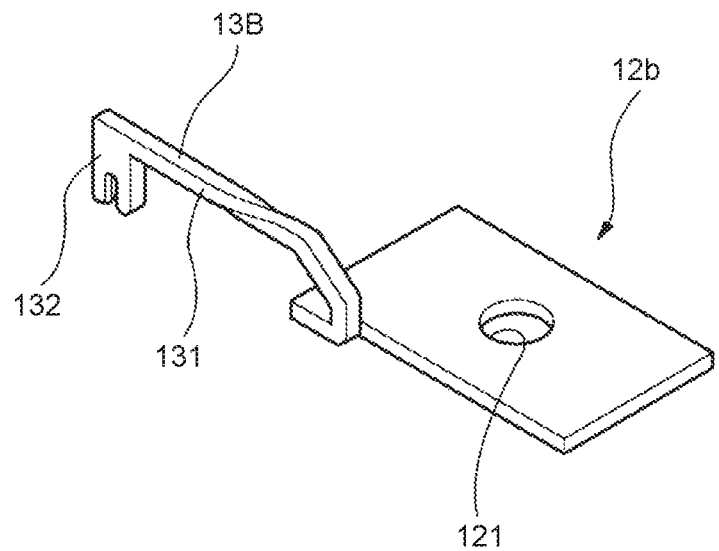
FIG. 7A is a perspective view for description of another aspect of a connecting member used for the electric wire connection structure of the invention.
Figure 7B:
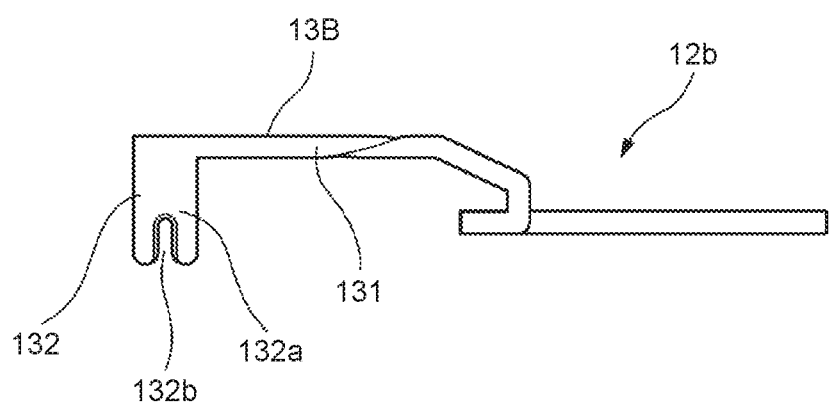
FIG. 7B is a side view for description of the other aspect of the connecting member used for the electric wire connection structure of the invention.

FIG. 1 is a perspective view illustrating an embodiment of a battery wiring module to which the electric wire connection structure of the invention is applied. FIG. 2 is a plan view illustrating the embodiment of the battery wiring module to which the electric wire connection structure of the invention is applied. FIG. 3 is a perspective view illustrating a battery pack in which the battery wiring module illustrated in FIGS. 1 and 2 is assembled with a battery module. FIG. 4 is a plan view illustrating the battery pack in which the battery wiring module illustrated in FIGS. 1 and 2 is assembled with the battery module. FIGS. 5A and 5B are a perspective view and a side view for description of an aspect of a connecting member used for the electric wire connection structure of the invention. FIG. 6 is a cross-sectional view taken along the line VI-VI of FIG. 2. FIGS. 7A and 7B are a perspective view and a side view for description of another aspect of a connecting member used for the electric wire connection structure of the invention. FIGS. 8A to 8D are drawings for description of processes of forming the connecting member illustrated in FIGS. 7A and 7B, and each of FIGS. 8A to 8D is a plan view of the connecting member in one process.

A detailed description will be given of the electric wire connection structure of the present embodiment with reference to FIGS. 1 to 8D. The electric wire connection structure of the present embodiment is applied to a battery wiring module 10 illustrated in FIGS. 1 and 2. The battery wiring module 10 is installed in a battery module 20 (FIGS. 3 and 4) that includes twelve battery cells 21a, 21b, . . . , 21l. The battery module 20 is formed by stacking the respective battery cells 21a, 21b, . . . , 21l in the same direction such that electrode terminals 22a, 22b, . . . , 22l on one side of the respective battery cells 21a, 21b, . . . , 21l are lined up and electrode terminals 22a, 22b, . . . , 22l on the other side are lined up. For example, in a battery module known as the battery module 20, positive terminals and negative terminals are alternately disposed or terminals of the same polarity are lined up and disposed in a line of the electrode terminals 22a, 22b, . . . , 22l. In a battery pack 1, the electrode terminals 22a, 22b, . . . , 22l on the same line included in a predetermined plurality of battery cells 21a, 21b, . . . , 21l are connected by a connecting member (first connecting member) such as a busbar 12a such that the plurality of battery cells 21a, 21b, . . . , 21l are connected in series or in parallel. The first connecting member electrically connects the electrode terminals 22a, 22b, . . . , 22l provided on two or more of the plurality of battery cells 21a, 21b, . . . , 21l, which are stacked in a given direction, and are next to each other in the direction. Further, in the battery pack 1, a connecting member (second connecting member) such as a busbar 12b is connected to each of the positive terminal 22a and the negative terminal 22l disposed at both ends of the battery module 20. In this example, the battery wiring module 10 includes the busbar 12a that electrically connects a positive terminal and a negative terminal adjacent to each other in the battery cells 21a, 21b, . . . , 21l. The battery wiring module 10 connects the battery cells 21a, 21b, . . . , 21l in series by being assembled with the battery module 20. The battery pack 1 includes the battery wiring module 10 and the battery module 20.

As illustrated in FIGS. 1 and 2, the battery wiring module 10 includes a flat cable 11, busbars 12, a connecting member 13, and a connector 14. As illustrated in FIGS. 3 and 4, the battery wiring module 10 is assembled with each of the electrode terminals 22a, 22b, . . . , 22l lined up on one side in the battery module 20 and the electrode terminals 22a, 22b, . . . , 22l lined up on the other side in the battery module 20.

The flat cable 11 is a belt-shaped cable, and includes a plurality of linear conductors 111 and an insulator 112 that covers the linear conductors 111 disposed in parallel to each other and on the same plane as illustrated in FIG. 6. The linear conductors 111 are configured using a conductive metal material. The respective linear conductors 111 are connected to different busbars 12 to function as electrical wires (voltage detection wires) for detecting voltages generated in the busbars 12. In other words, in the battery wiring module 10, each combination having an electrical connection relation by one of the linear conductors 111 and one of the busbars 12 is configured. In the present specification, the linear conductors 111 may be referred to as voltage detection wires 111.

In addition, the insulator 112 is made of various insulating materials having high insulation properties. The insulator 112 is formed to accommodate the voltage detection wires 111 disposed in parallel on the same plane. In this way, the respective voltage detection wires 111 are kept insulated from each other. A member included in the insulator 112 to accommodate the voltage detection wires 111 is referred to as a connecting portion 112a. As illustrated in FIGS. 1 and 6, one ends of the plurality of busbars 12 are buried in the connecting portion 112a. In this way, the plurality of busbars 12 is held by the connecting portion 112a. On the other hand, a fixed portion 112b, in which the other ends of the plurality of busbars 12 are buried, is formed on the opposite side of the busbars 12 to face the connecting portion 112a in the insulator 112. The plurality of busbars 12 is held by the fixed portion 112b. Each of the plurality of busbars 12 is inhibited from being detached from the insulator 112 when the one ends and the other ends are held by the connecting portion 112a and the fixed portion 112b.

The busbars 12 are flat plate-shaped members. The busbars 12 are made of a conductive metal material. The busbars 12 have a rectangular shape as a whole, and through-holes 121 are formed in a plate thickness direction thereof. The busbars 12 include two types of busbars 12a and 12b having different shapes.

In the busbar 12a corresponding to one type of the busbars, two through-holes 121 are arranged in parallel along a longitudinal direction of the rectangular busbar 12a. One of positive terminals and one of negative terminals adjacent to each other among the electrode terminals 22a, 22b, . . . , 22l on the battery cells 21a, 21b, . . . , 21l are inserted into the two through-holes 121. For example, in a given busbar 12a, a negative terminal 22b on the battery cell 21b is inserted into one of the through-holes 121, and a positive terminal 22c on the battery cell 21c is inserted into the other one of the through-holes 121 (FIG. 4).

In the busbar 12b corresponding to the other type of the busbars, one through-hole 121 is provided near a center of the rectangular busbar 12b. As illustrated in FIGS. 3 and 4, a busbar for inserting the positive terminal 22a on the battery cell 21a positioned on one outermost side of the battery module 20 into the through-hole 121 and a busbar for inserting the negative terminal 22l on the battery cell 21l positioned on the other outermost side of the battery module 20 into the through-hole 121 are prepared as the busbar 12b.

As illustrated in FIGS. 3 and 4, a battery wiring module in which six busbars 12a are disposed such that the through-holes 121 are lined up (the battery wiring module 10 positioned on a lower side of FIG. 4) and a battery wiring module in which five busbars 12a and two busbars 12b are disposed such that the through-holes 121 are lined up and the two busbars 12b are positioned at both sides of the five busbars 12a (the battery wiring module 10 positioned on an upper side of FIG. 4) are prepared as the battery wiring module 10. As illustrated in FIGS. 3 and 4, the busbars 12a are alternately disposed when the two battery wiring modules 10 are assembled with the battery module 20. In this way, the positive terminal and the negative terminal adjacent to each other among the electrode terminals 22a, 22b, . . . , 22l on the battery cells 21a, 21b, . . . , 21l adjacent to one another are electrically connected to each other in the battery pack 1, and thus it is possible to implement a configuration in which the battery cells 21a, 21b, . . . , 21l are connected in series.

As illustrated in FIGS. 1 to 4, each of the busbars 12a and the busbars 12b has one end buried in the connecting portion 112a of the insulator 112 and held by the connecting portion 112a and the other end buried in the fixed portion 112b of the insulator 112 and held by the fixed portion 112b. In this instance, a rectangular through-hole 122 is formed between two busbars 12a adjacent to each other and between a busbar 12a and a busbar 12b adjacent to each other. For this reason, the two busbars 12a adjacent to each other are separated from each other, and the busbar 12a and the busbar 12b adjacent to each other are separated from each other. In this way, the busbars 12a and the busbars 12b held by the insulator 112 are treated as a body integrated with the flat cable 11. As a result, the busbars 12a and the busbars 12b need not to be separately attached to the electrode terminals 22a, 22b, . . . , 22l, and thus efficiency of an operation of assembling the battery wiring module 10 with the battery module 20 is improved.

In addition, as illustrated in FIG. 6, the busbars 12a and the busbars 12b are disposed on the same plane as a plane on which the voltage detection wires 111 are disposed. For this reason, the flat cable 11, the busbars 12a and the busbars 12b are formed in a shape of a belt as a whole.

The connecting member 13 is a member for electrically connecting one of the voltage detection wires 111 and one of the busbars 12a. In other words, the connecting member 13 is provided for each combination of the linear conductors 111 and the busbars 12a. The connecting member 13 is made of a conductive metal material, and includes a connecting member main body 131 and a pressure welding blade portion 132 connected to the connecting member main body 131 as illustrated in FIGS. 5 and 6.

For example, the connecting member main body 131 has a shape of a bar extending in a direction parallel to each of the voltage detection wires 111, and faces at least one of the respective voltage detection wires 111. One end of the connecting member main body 131 is disposed to face a certain one of the voltage detection wires 111, and is connected to the pressure welding blade portion 132 which is extended toward the one of the voltage detection wires 111. The other end of the connecting member main body 131 is disposed on a side of a certain one of the busbars 12a, and is bent toward the one of the busbars 12a. Hereinafter, the other end of the connecting member main body 131 is referred to as a weld 133. A longitudinal length of the connecting member main body 131 is appropriately designed according to an interval between the one of the busbars 12a and the one of the voltage detection wires 111 to which the connecting member 13 is to be welded.

A pressure welding blade 132a is formed in the pressure welding blade portion 132 to dissect the connecting portion 112a of the flat cable 11 by eating into the connecting portion 112a. The pressure welding blade 132a is formed in a U-shape, and a blade is formed along the U-shape. In the pressure welding blade portion 132, a pressure welding groove 132b is formed between blade portions of the pressure welding blade 132a facing each other. In the connecting member 13, as illustrated in FIG. 6, when the pressure welding blade portion 132 is press-fitted into the connecting portion 112a such that the one of the voltage detection wires 111 of the flat cable 11 enters the pressure welding groove 132b, the connecting portion 112a surrounding the voltage detection wires 111 is dissected, and the one of the voltage detection wires 111 is exposed. As illustrated in FIG. 6, further press-fitting of the pressure welding blade portion 132 into the connecting portion 112a is regulated when the one of the voltage detection wires 111 reaches a deepest portion of the pressure welding groove 132b. The one of the voltage detection wires 111 exposed from the connecting portion 112a touches the pressure welding blade 132a forming the pressure welding groove 132b (particularly, the deepest portion of the pressure welding groove 132b). In this way, the pressure welding blade portion 132 press-fitted into the connecting portion 112a is attempted to be electrified with the voltage detection wires 111.

The connector 14 is provided at one end side in a longitudinal direction of the flat cable 11. The connector 14 holds a plurality of terminals therein, and each of the terminals is connected to one of the voltage detection wires 111 of the flat cable 11. The connector 14 is connected to a voltage monitoring unit (not illustrated) provided in the battery pack 1. In this way, the voltage monitoring unit may determine whether the battery module 20 is abnormal based on voltage values among the battery cells 21a, 21b, . . . , 21l input through the respective voltage detection wires 111.

When the above-described battery wiring module 10 is installed in the battery module 20, the battery wiring module 10 is put close to the battery module 20 while performing positioning such that partition portions 23 extending upward from between the battery cells 21a, 21b, . . . , 21l are inserted into the rectangular through-holes 122. In addition, at the time of assembly, the electrode terminals 22a, 22b, . . . , 22l are inserted into the through-holes 121 of the respective busbars 12, and the electrode terminals 22a, 22b, . . . , 22l are screwed by nuts. In this way, the battery wiring module 10 is installed in the battery module 20.

The connecting member main body 131 is described again. The weld 133 positioned at the other end of the connecting member main body 131 is bent toward the busbars 12a. In other words, as illustrated in FIGS. 5A and 5B, the weld 133 is bent in a direction which is the same as or corresponds to a direction in which the pressure welding blade portion 132 extends from the connecting member main body 131. As illustrated in FIGS. 1 to 4, the weld 133 bent in this way comes into contact with the busbar 12a in between the two through-holes 121 of the busbar 12a, and the like when the pressure welding blade portion 132 is press-fitted into the connecting portion 112a. In this position, the weld 133 is welded to the busbar 12*a*. When the weld 133 corresponding to a portion of the connecting member main body 131 is welded, the connecting member main body 131 is electrically connected to the busbar 12*a*.

Herein, a description will be given of a reason for bending the other end of the connecting member main body 131. As illustrated in FIG. 6, the other end of the connecting member main body 131 is bent to avoid the connecting portion 112*a* such that the connecting member main body 131 does not touch the connecting portion 112*a* which is thicker than the voltage detection wires 111 and the busbar 12*a*. It is presumed that the connecting member 13 is attached to the connecting portion 112*a* such that the connecting member main body 131 touches the connecting portion 112*a*. In this case, an external force is applied to the connecting member main body 131 in an opposite direction to a direction in which the pressure welding blade portion 132 is press-fitted into the connecting portion 112*a* by the connecting portion 112*a* pushing back the connecting member main body 131. For this reason, there is concern that the connecting member 13 may be detached from the connecting portion 112*a*. On the other hand, when the other end is bent as in the connecting member main body 131 of the present embodiment, the connecting member main body 131 does not touch the connecting portion 112*a*. For this reason, in the present embodiment, the connecting member 13 may be inhibited from being detached from the connecting portion 112*a*.

Hereinbefore, description has been given of a structure for electrically connecting one of the voltage detection wires 111 and one of the busbars 12*a* by the connecting member 13 provided as a separate body. This structure is useful for the busbar 12*a* which obtains an enough size to dispose the connecting member 13 or weld the weld 133. On the other hand, for example, referring to the relatively small busbar 12*b*, there may be difficulty in attaching the connecting member 13 to the busbar 12*b*. In this regard, hereinafter, a description will be given of a structure in which a connecting member 13B is integrated with a busbar 12*b*.

As illustrated in FIGS. 7A and 7B, the connecting member 13B is provided by being extended from the busbar 12*b*. The connecting member 13B is formed by bending a predetermined part of a connecting member main body 131 such that a direction D (FIGS. 8B to 8D) in which a pressure welding blade portion 132 is press-fitted is perpendicular to the flat plate-shaped busbar 12*b*. A method of manufacturing the busbar 12*b* including the connecting member 13B will be given below.

Figure 8A:
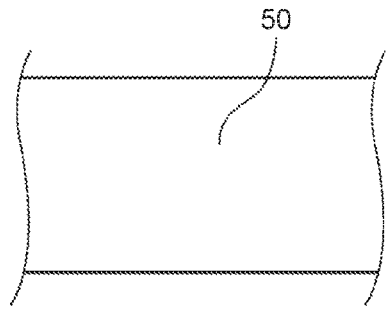
FIG. 8A is a plan view of the connecting member illustrated in FIGS. 7A and 7B for description of a process of forming the connecting member.

First, as illustrated in FIG. 8A, a flat plate-shaped metallic plate 50 is prepared.

Figure 8B:
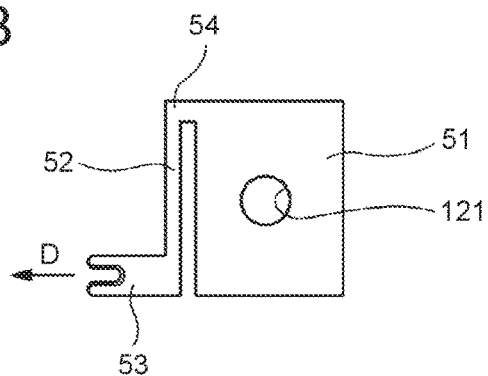
FIG. 8B is a plan view of the connecting member illustrated in FIGS. 7A and 7B for description of a process of forming the connecting member.

Subsequently, as illustrated in FIG. 8B, the metallic plate 50 is punched. A busbar main body portion 51 in which a through-hole 121 is formed, a bar-shaped portion 52 to be formed as a connecting member main body 131, a blade body portion 53 to be formed as a pressure welding blade portion 132, and a stretched portion 54 that connects the busbar main body portion 51 and the bar-shaped portion 52 are formed in the punched metallic plate 50. The busbar main body portion 51, the bar-shaped portion 52, the blade body portion 53, and the stretched portion 54 are formed on the same plane.

Figure 8C:
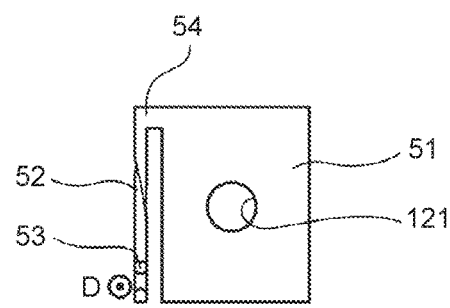
FIG. 8C is a plan view of the connecting member illustrated in FIGS. 7A and 7B for description of a process of forming the connecting member.

Subsequently, as illustrated in FIG. 8C, the blade body portion 53 is rotated by 90° using a longitudinal direction of the bar-shaped portion 52 as an axis by twisting the bar-shaped portion 52. When the blade body portion 53 is rotated in this way, the blade body portion 53 rises from the busbar main body portion 51. In this instance, the direction D in which the pressure welding blade portion 132 is press-fitted is perpendicular to the flat plate-shaped busbar 12*b* (the busbar main body portion 51), and is an upward direction (forward direction of FIGS. 8C) of the flat plate-shaped busbar 12*b* (the busbar main body portion 51).

Figure 8D:
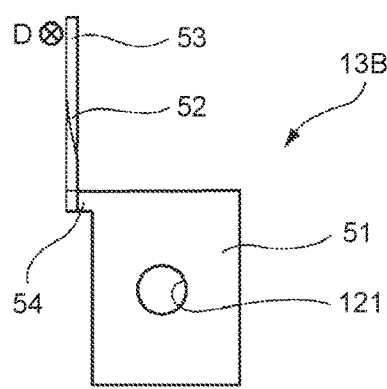
FIG. 8D is a plan view of the connecting member illustrated in FIGS. 7A and 7B for description of a process of forming the connecting member.

Subsequently, as illustrated in FIG. 8D, the bar-shaped portion 52 is bent toward a direction in which the blade body portion 53 extends from the busbar main body portion 51 (a direction along a virtual plane parallel to a place of the busbar main body portion 51) using the stretched portion 54 as a fulcrum. When the bar-shaped portion 52 is bent in this way, the direction D in which the pressure welding blade portion 132 is press-fitted is reversed when compared to a case of FIG. 8C, and becomes perpendicular to the flat plate-shaped busbar 12*b* and becomes a downward direction of the busbar 12*b* (backward direction of FIG. 8D).

In this way, the busbar 12*b* having the connecting member 13B which is formed by the bar-shaped portion 52 and the blade body portion 53 is manufactured. According to the busbar 12*b* having the connecting member 13B, there is no need to weld the connecting member 13B and the busbar 12*b*. This busbar 12*b* is particularly useful for a circumstance in which there is difficulty in attaching the connecting member 13 corresponding to a separate body as in the above-described busbar 12*a*.

When the busbar 12*b* is formed from the flat plate-shaped metallic plate 50, a scheme of twisting and bending the bar-shaped portion 52 is not restricted to a scheme described with reference to FIGS. 8A to 8D. In the busbar 12*b*, the bar-shaped portion 52 may be bent such that the direction D in which the pressure welding blade portion 132 is press-fitted is perpendicular to the flat plate-shaped busbar main body portion 51.

Hereinbefore, the electric wire connection structure of the present embodiment has a configuration in which the pressure welding blade portion 132 provided in the connecting members 13 and 13B is press-fitted into the connecting portion 112*a* when the busbars 12 and the voltage detection wires 111 of the flat cable 11 are connected to each other. For this reason, there is no need to process the flat cable in advance as in the past. Therefore, the electric wire connection structure may reduce processes for manufacturing the battery wiring module.

In addition, the electric wire connection structure of the present embodiment has a configuration in which a portion of the connecting member main body 131 (in particular the weld 133) is welded to the busbars 12. In this way, the electric wire connection structure may strongly and easily fix the connecting member main body 131 to the busbars 12.

Further, the electric wire connection structure of the present embodiment has a configuration in which the connecting member 13B is provided to extend from the busbar 12*b*. In particular, the busbar 12*b* and the connecting member 13B are formed by punching the metallic plate 50. According to this configuration, it is possible to manufacture busbars including a connecting member by press molding which is a relatively easy scheme. In addition, according to this configuration, there is no need to weld the connecting member 13B and the busbar 12*b*. The busbar 12*b* is particularly useful for a circumstance in which there is difficulty in attaching the connecting member 13 corresponding to a separate body as in the busbars 12.

According to an electric wire connection structure of the invention, a flat cable may not be processed in advance. Thus, the electric wire connection structure may reduce processes for manufacturing a battery wiring module.

In description of the electric wire connection structure of the present embodiment, a structure in which the busbars 12 are held by the insulator 112 of the flat cable 11 has been given as an embodiment. The electric wire connection structure of the present embodiment is not restricted only to an application to this holding structure. The electric wire connection structure may be applied to a battery wiring module having a structure, in which busbars are not held by a flat cable, in other words, the flat cable and the busbars are separated from each other.

In addition, in description of the electric wire connection structure of the present embodiment, a structure, in which the electrode terminals 22a, 22b, . . . , 22l are inserted into the through-holes 121 of the respective busbars 12 and the electrode terminals 22a, 22b, . . . , 22l are screwed by nuts, has been given as an embodiment. The electric wire connection structure of the present embodiment is not restricted only to an application to the structure in which the electrode terminals 22a, 22b, . . . , 22l are inserted into the through-holes 121. When the respective busbars 12 are electrically connected to the electrode terminals 22a, 22b, . . . , 22l, the respective busbars 12 may be electrically connected to the electrode terminals 22a, 22b, . . . , 22l by welding the respective busbars 12 and the electrode terminals 22a, 22b, . . . , 22l.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire connection structure comprising:
   a flat cable including a plurality of linear conductors and an insulator covering the linear conductors separated from each other and disposed on the same plane;
   a plurality of busbars for electrically connecting electrode terminals provided on at least two or more battery cells stacked in a given direction from among a plurality of battery cells stacked in the given direction and included in a battery module, the electrode terminals being lined up in the given direction; and
   a connecting member provided for each combination of the linear conductors and the busbars, the connecting member including a connecting member main body and a pressure welding blade portion connected to the connecting member main body, a pressure welding groove being formed in the pressure welding blade portion,
   wherein the insulator includes a connecting portion configured to accommodate each of the linear conductors therein to insulate the linear conductors from each other, and
   the connecting member allows an inner edge of the pressure welding groove to contact an associated one of the linear conductors exposed from the connecting portion of the insulator in accordance with press-fitting into the pressure welding groove without letting the connecting member main body come into contact with the connecting portion, and allows the connecting member main body to be electrically connected to the busbar; and
   wherein the busbars and the connecting member are formed by punching a metallic plate, and
   the connecting member main body of the connecting member is bent up and down such that a direction in which the pressure welding blade portion is press-fitted onto the linear conductors is perpendicular to the busbars having a flat-plate shape and the connecting member main body is spaced from the connection portion.

2. The electric wire connection structure according to claim 1, wherein
   the connecting member electrically connects a portion of the connecting member main body to the busbars by welding the portion to the busbars.

3. The electric wire connection structure according to claim 1, wherein
   the connecting member is provided to extend from the busbars.

4. The electric wire connection structure according to claim 1, wherein
   the plurality of linear conductors are spaced apart from the plurality of busbars in a direction perpendicular to the given direction in which the plurality of battery cells are stacked.

5. The electric wire connection structure according to claim 1, wherein
   the plurality of busbars are disposed on the same plane as the plurality of linear conductors.

6. The electric wire connection structure according to claim 1, wherein
   the plurality of linear conductors are attached to the plurality of busbars by the insulator.

7. The electric wire connection structure according to claim 1, wherein
   the plurality of busbars are held by the insulator.

* * * * *